United States Patent
Jampala et al.

(10) Patent No.: US 12,524,166 B2
(45) Date of Patent: Jan. 13, 2026

(54) FILE TRANSFER PROTOCOL SERVER DEPLOYMENT AS PART OF DU NETWORK FUNCTION OF WIRELESS NETWORK

(71) Applicant: Rakuten Symphony, Inc., Tokyo (JP)

(72) Inventors: Naga Krishna Prasad Jampala, Bangalore (IN); Mahesh Sivapuram, Banaglore (IN); Arun S Menon, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 311 days.

(21) Appl. No.: 18/022,580

(22) PCT Filed: Feb. 8, 2023

(86) PCT No.: PCT/US2023/062212
§ 371 (c)(1),
(2) Date: Feb. 22, 2023

(87) PCT Pub. No.: WO2024/144892
PCT Pub. Date: Jul. 4, 2024

(65) Prior Publication Data
US 2024/0220133 A1    Jul. 4, 2024

(30) Foreign Application Priority Data
Dec. 27, 2022   (IN) .............................. 202241075852

(51) Int. Cl.
*G06F 3/06* (2006.01)
*G06F 21/31* (2013.01)
(Continued)

(52) U.S. Cl.
CPC .......... *G06F 3/0622* (2013.01); *G06F 3/0655* (2013.01); *G06F 3/067* (2013.01); *G06F 21/31* (2013.01); *H04W 4/50* (2018.02)

(58) Field of Classification Search
CPC ...... G06F 3/0622; G06F 3/0655; G06F 3/067; G06F 21/31; H04W 4/50
See application file for complete search history.

(56) References Cited

U.S. PATENT DOCUMENTS

| | | | |
|---|---|---|---|
| 8,744,948 B1 * | 6/2014 | McVickar | G06Q 40/12 705/31 |
| 2011/0219113 A1 * | 9/2011 | Grewal | H04L 61/2514 709/224 |

(Continued)

OTHER PUBLICATIONS

International Search Report issued Jul. 21, 2023 in International Application No. PCT/US23/62212.

(Continued)

*Primary Examiner* — Darshan I Dhruv
(74) *Attorney, Agent, or Firm* — Sughrue Mion, PLLC

(57) ABSTRACT

Embodiments herein provide a wireless network (1000) for handling a File Transfer Protocol (FTP) server deployment as part of a Distributed Unit (DU) network function of the wireless network (1000). The wireless network (1000) includes a RU manager container (140) hosting a DU application and application container sensitive information at a first directory. Further, the system includes a sidecar container (160) that hosts the FTP server, a RU software (SW) image of an RU and sidecar container credentials at a second directory. The sidecar container (160) sends sidecar container credentials to the RU (150) in the wireless network to download the RU software image using a file transfer protocol (FTP) service (or the FTP session). The RU (150) establishes the FTP session with the sidecar container (160) using the sidecar container credentials and downloads the RU software image from the sidecar container using the FTP service.

10 Claims, 4 Drawing Sheets

(51) Int. Cl.
*H04W 4/30* (2018.01)
*H04W 4/50* (2018.01)

(56) References Cited

U.S. PATENT DOCUMENTS

| | | | |
|---|---|---|---|
| 2014/0096207 A1* | 4/2014 | Gilbert | H04W 12/069 |
| | | | 726/5 |
| 2017/0180346 A1* | 6/2017 | Suarez | G06F 9/45558 |
| 2019/0245740 A1* | 8/2019 | Kachhla | H04L 41/045 |
| 2020/0359451 A1* | 11/2020 | Reno | H04L 41/0806 |
| 2021/0352132 A1* | 11/2021 | Nix | H04L 67/06 |
| 2022/0116445 A1* | 4/2022 | Filippou | H04L 41/0806 |
| 2022/0255941 A1* | 8/2022 | Sienicki | G06F 21/53 |
| 2023/0006889 A1* | 1/2023 | Thyagaturu | H04L 41/5054 |
| 2023/0065431 A1* | 3/2023 | Kumar | G06F 9/445 |

OTHER PUBLICATIONS

Written Opinion issued Jul. 21, 2023 in International Application No. PCT/US23/62212.

\* cited by examiner

FILE TRANSFER PROTOCOL SERVER DEPLOYMENT AS PART OF DU NETWORK FUNCTION OF WIRELESS NETWORK

CROSS REFERENCE TO RELATED APPLICATIONS

The present application claims priority to and is the 35 U.S.C. § 371 United States National Phase application based on International Patent Application No. PCT/US23/62212, filed Feb. 8, 2023, and entitled "File Transfer Protocol Server Deployment as Part of DU Network Function of Wireless Network" which claims priority to Indian Patent Appl. No. 202241075852 entitled "File Transfer Protocol Server Deployment as Part of DU Network Function of Wireless Network" filed Dec. 27, 2022, which are hereby incorporated by reference in their entireties.

FIELD OF INVENTION

The present disclosure relates to a wireless network, and more particularly to the wireless network and a method for handling File Transfer Protocol (FTP) server deployment as part of a Distributed Unit (DU) network function of the wireless network.

BACKGROUND

In general, Radio units (RU) at a cell site are directly connected to a Distributed Unit (DU) in a wireless network. The RUs do not have any internet protocol (IP) connectivity outside of the DU. Hence for a software management of the RU, a RU software image has to be hosted on the DU. Further, Open Radio Access Network work group 4 (O-RAN WG4) management plane specification uses a Secure File Transfer Protocol (SFTP) for software image download procedure into the RU. Hence, the DU has to support hosting a solid-state hybrid drive (SSHD) service or to which the RU will connect using a SFTP and download the software image from a given directory path. A RU manager is a POD (i.e., smallest execution unit in Kubernetes/containers) that manages management plane communication towards the RU. The RU manager fetches the RU software image from a central repository and has to host that image locally within the DU for the RU to download. Since, the DU is a containerized solution, the SSHD service has to run within the RU manager. Running SSHD outside of the RU manager means, the RU manager has to use operating system (OS) level privileges to access the software image directory and write to it (which should be avoided). However, current systems and methods guideline do not allow running SSHD within the container. In other words, existing method and systems don't support virtualized secure SFTP/FTP Secure server as part of DU network function.

FIG. 1 illustrates an example overview of a wireless network (1000) for handling a FTP server deployment, according to prior art. The wireless network (1000) includes a central repository (110), a DU node (120), the RU manager (130), a RU manager container (140) and the RU (150).

In the wireless network (1000), at S1, the RU manager (130) is a POD that manages management plane communication towards the RU (150). The RU (150) sends a request to retrieve the RU software image from the central repository (110). At S2, the central repository (110) receives the request from the RU manager (130) and sends the RU software image to the RU manager (130) and hosts the RU software image locally within the DU node (120) for the RU (150) to download the RU software image. At S3, the RU (150) will connect to a SSDH service using a SFTP service. At S4, the RU software image is downloaded from a given directory path using the SFTP service.

Thus, it is desired to address the above-mentioned disadvantages or other shortcomings or at least provide a useful alternative.

OBJECT OF INVENTION

The principal object of the embodiments herein is to provide a wireless network and a method for handling a FTP server deployment as part of a DU network function of the wireless network, so as to improve the security and reduces a network load in the wireless network.

Another object of the embodiment is to separately host a FTP server and a RU software image in a FTP server sidecar container and a sensitive information in a RU manager container so that the RU has access only to the FTP server sidecar container without having access to the sensitive information stored in the RU manager container.

Yet another object of the embodiment is to provide an allocated restricted access to the RU to directly download the RU software image from the FTP server sidecar container without exposure of the sensitive information of a file system.

SUMMARY

Accordingly, the embodiment herein discloses a system (or wireless network) for handling a File Transfer Protocol (FTP) server deployment as part of a Distributed Unit (DU) network function of a wireless network. The system includes a RU manager container hosting a DU application and application container sensitive information at a first directory. Further, the system includes a sidecar container that hosts the FTP server, a RU software (SW) image of an RU and sidecar container credentials at a second directory. The sidecar container sends sidecar container credentials to the RU in the wireless network to download the RU software image using a file transfer protocol (FTP) service. The RU establishes a FTP service (or FTP session) with the sidecar container using the sidecar container credentials and downloads the RU software image from the sidecar container using the FTP service.

Accordingly, the embodiment herein discloses a method for handling a FTP server deployment as part of a DU network function of a wireless network. The method includes hosting a FTP server in a sidecar container. Further, the method includes storing RU software image in the sidecar container. Further, the method includes hosting a DU application in a Radio Unit (RU) manager container. Further, the method includes storing application container sensitive information in the Radio Unit (RU) manager container. Further, the method includes sending the sidecar container credentials from the sidecar container to a RU for downloading the RU software image from the sidecar container using a FTP service.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The method and the wireless network are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
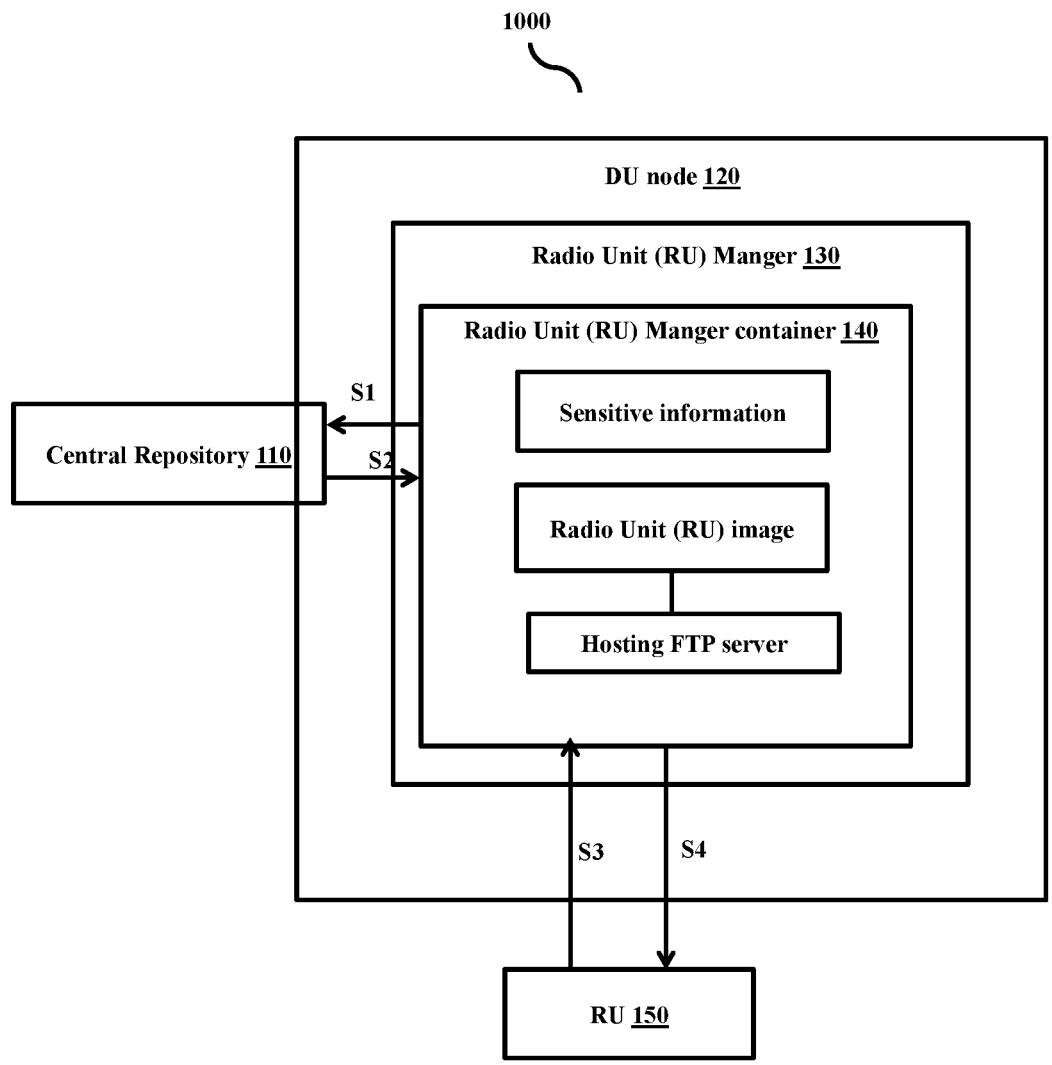
FIG. 1 illustrates an example overview of a wireless network for handling a FTP server deployment, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for handling a FTP server deployment as part of a DU network function of a wireless network. The method includes hosting a FTP server in a sidecar container. Further, the method includes storing RU software image in the sidecar container. Further, the method includes hosting a DU application in a RU manager container. Further, the method includes storing application container sensitive information in the RU manager container. Further, the method includes sending the sidecar container credentials from the sidecar container to a RU for downloading the RU software image from the sidecar container using a FTP service.

Unlike conventional methods and systems, the proposed method can be used to handle File Transfer Protocol (FTP) server deployment as part of a DU network function of a wireless network, so as to improve the security and reduces a network load in the wireless network.

Figure 2:
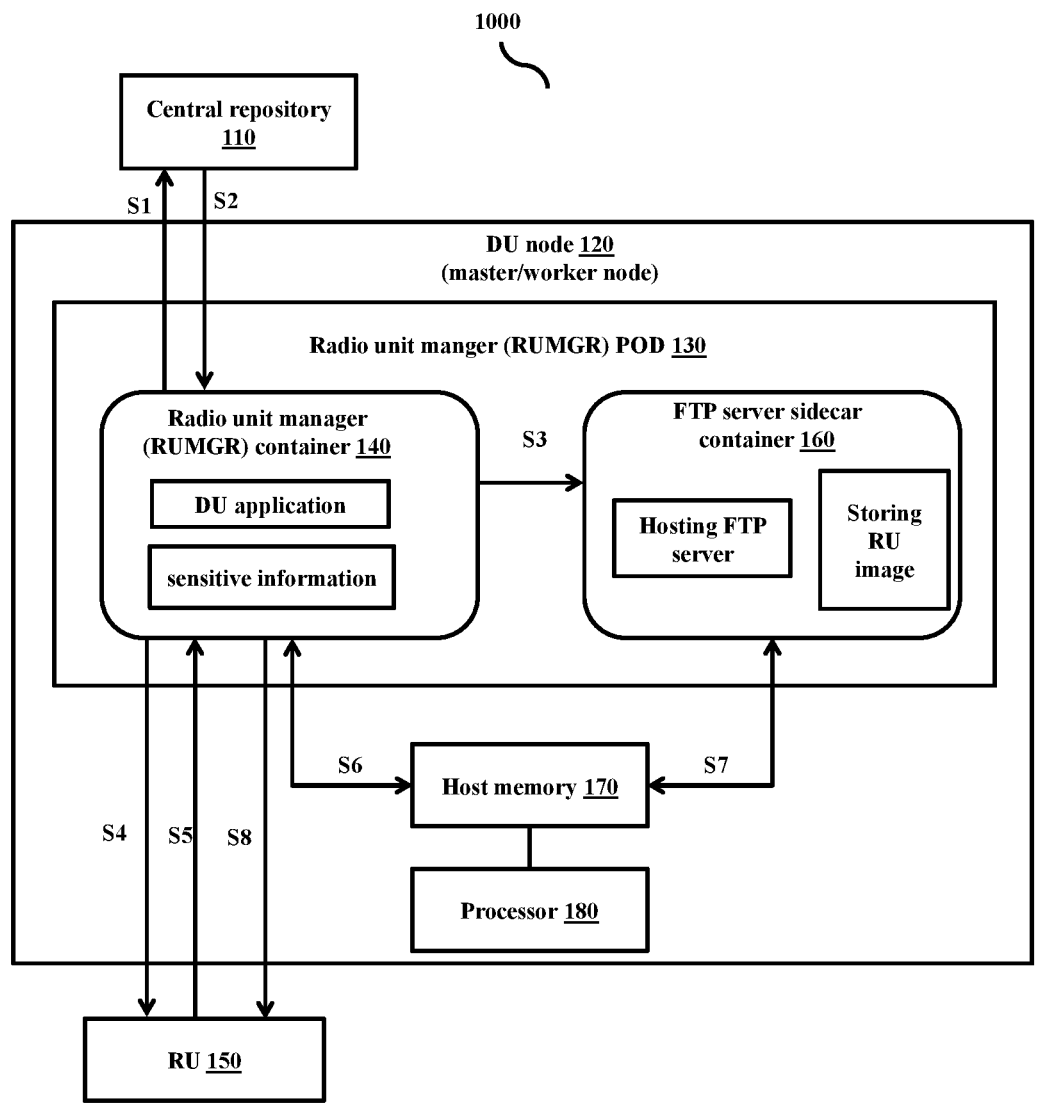
FIG. 2 illustrates an example overview of a wireless network for handling a FTP server deployment as part of a DU network function of the wireless network, according to the embodiments as disclosed herein.
Figure 3:
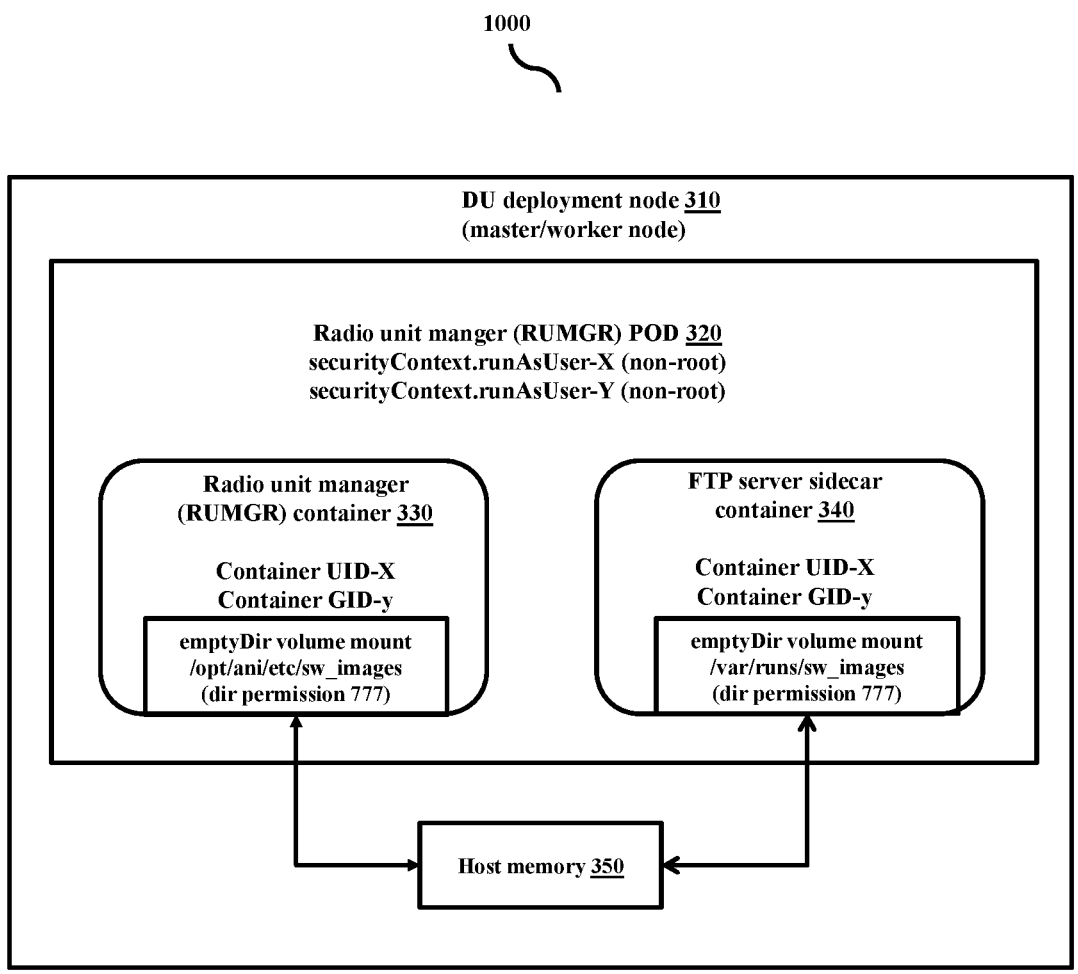
FIG. 3 is an example overview of the wireless network for handling the FTP server deployment as part of the DU network function, according to the embodiments as disclosed herein.
Figure 4:
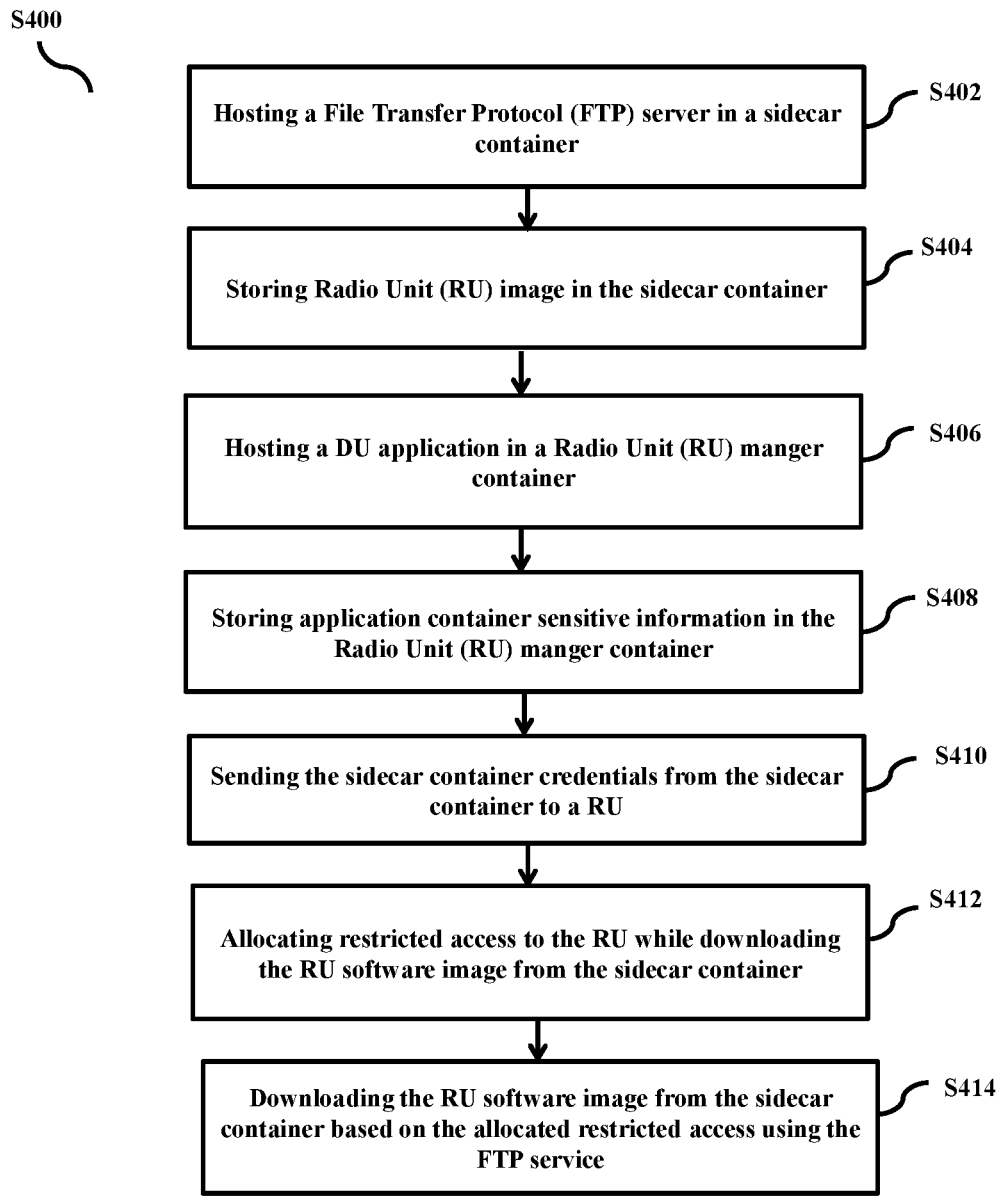
FIG. 4 is a flow chart illustrating a method for handling the FTP server deployment as part of the DU network function of the wireless network, according to the embodiments as disclosed herein.

Referring now to the drawings and more particularly to FIGS. 2 through 4, where similar reference characters denote corresponding features consistently throughout the figures, there are shown preferred embodiments.

FIG. 2 is an overview of a wireless network (1000) for handling a FTP server deployment as part of a DU network function of the wireless network (1000), according to the embodiments as disclosed herein. The wireless network (1000) can be, for example, but not limited to, a fourth generation (4G) network, a fifth generation (5G) network, a sixth generation (6G) network, an open radio access network (ORAN) network or the like. The wireless network (1000) is also called as a system. The system (or wireless network) (1000) includes a central repository (110), a DU node (120), a RU manager (130), a RU manager container (140), a RU (150), FTP server sidecar container (160), a host memory (170) and a processor (180)).

The RU manager container (140) hosts a DU application and application container sensitive information at a first directory (not shown). The FTP server sidecar container (160) hosts the FTP server, the RU software image of the RU (150) and sidecar container credentials at a second directory (not shown). The sidecar container (160) sends sidecar container credentials to the RU (150) to download the RU software image using a FTP service. Here, the proposed method offers for example secure FTP service.

The RU (150) establishes a FTP session with the sidecar container (160) using the sidecar container credentials and downloads the RU software image from the sidecar container (160) using the FTP service. The FTP service is established with the sidecar container using the sidecar container credentials by sending the sidecar container credentials to the sidecar container (160) to download the RU software image from the sidecar container (160) using the FTP service, validating the RU (150) by the RU manager (130) based on the sidecar container credentials, and establishing the FTP service between the RU (150) and the sidecar container (160) upon success connection with the RU manager (130).

In an embodiment, the RU software image is downloaded from the sidecar container using the FTP by allocating the restricted access to the RU (150) while downloading the RU software image from the sidecar container (160) and downloading the RU software image from the sidecar container (160)) based on the allocated restricted access using the FTP service. The restricted access can be, for example, but not limited to an enable read and write access only to a second directory hosting the RU SW image at the sidecar container, disable read and write access to the first directory hosting the sensitive information in the application container, enable to establish FTP session and disable SSH access to the RU, disable access to any proprietary information in the sidecar container, and disable read and write access to any host path volumes in the sidecar container.

The sidecar container (160) provides the FTP service using an unprivileged port. The proposed method intends to use Kubernetes emptyDir volume as a shared storage between two containers (RUMgr and FTP Server) in the POD. When using emptyDir volumes, the storage is allocated from node ephemeral storage. The proposed FTP server can use any port from 1024 to 65535. If the unprivileged ports are used to start the FTP server, any additional Linux capabilities are not required to be provided when starting the FTP server application, especially when the FTP server application is running as a non-root regular user.

The sidecar container (160) creates a mapping between the sidecar container credentials with the application container sensitive credentials. A credential i.e., a username and password is created during the creation of the FTP server container (340) in the deployment of the POD. This credential is provided to the RU as part of the sensitive information exchange between RUMgr container and RU over a secure TLS channel. The RU uses the credential to connect to the FTP server running in the sidecar container to download the RU SW image.

In an example, At S1, the RU manager (130) is the POD that manages management plane communication towards the RU (150). The RU (150) sends a request to retrieve the RU software image from the central repository (110). At S2, the central repository (110) receives the request from the RU manager (130) and sends the RU software image to the RU manager (130). At S3, the FTP server sidecar container (160)) hosts the RU software image locally within the FTP server sidecar container (160) for the RU (150) to download the RU software image. The FTP server sidecar container (160) hosts the FTP server and stores Radio Unit (RU) image. The RU manager container (or application container) (140)) hosts the DU application and includes the sensitive information (e.g., password or the like).

At S4, the RU manager container (140) will send the sensitive information to the RU (150) to download the RU software image. At S5, the RU (150) establish a FTP session between the RU (150) and the sidecar container (160) using the sensitive information received from the RU manager container (or application container) (140)). At S6, the RU manager container (140)) allocates the restricted access to the RU (150) while downloading the RU software image from the FTP server sidecar container (160).

At S7, the FTP server sidecar container (160) performs mapping to the sensitive information inside the FTP server sidecar container (160). At S8: the RU software image is downloaded from the sidecar container using an unprivileged port.

Further, the processor (180) is configured to execute instructions stored in the memory (170) and to perform various processes. The memory (170) also stores instructions to be executed by the processor (180). The memory (170) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (170) may, in some examples, be considered a non-transitory storage medium. The term "non-transitory" may indicate that the storage medium is not embodied in a carrier wave or a propagated signal. However, the term "non-transitory." should not be interpreted that the memory (170)) is non-movable. In certain examples, a non-transitory storage medium may store data that can, over time, change (e.g., in Random Access Memory (RAM) or cache).

The wireless network (1000) can be used to handle the FTP server deployment as part of the DU network function, so as to improve the security and reduces a network load in the wireless network (1000).

In the conventional system, the FTP server, the RU software image, and the sensitive information is hosted in the RU manager (130) due to which a system data is vulnerable as the sensitive stored in the RU manager (130) will be accessible by the RU (150). Unlike the conventional system, the proposed disclosure is to split the hosting of the FTP server and the RU software image in the sidecar container (160) and the sensitive information in the RU manager container (140). This allows the RU (150) to access the FTP server sidecar container (160) to directly download the RU software image using the FTP server without exposing any data stored in the RU manager container (140).

Although the FIG. 2 shows various hardware components of the wireless network (1000) but it is to be understood that other embodiments are not limited thereon. In other embodiments, the wireless network (1000) may include less or more number of components. Further, the labels or names of the components are used only for illustrative purpose and does not limit the scope of the invention. One or more components can be combined together to perform same or substantially similar function in the wireless network (1000).

FIG. 3 is an example overview of the wireless network (1000) for handling the FTP server deployment as part of the DU network function, according to the embodiments as disclosed herein. The wireless network (1000) includes a DU deployment node (310) (e.g., master/worker node), a host memory (350) and a radio unit manager (RUMGR) POD (320) having a radio unit manager (RUMGR) container (330) and a FTP server sidecar container (340). The host memory (350) is coupled with the radio unit manager (RUMGR) container (330) and the FTP server sidecar container (340) in the RUMGR POD (320). The RUMGR container (330) interacts with the RU (110). The RUMGR container (330) is used to obtaining the configuration from the RU (110) and save from security attack. The FTP server sidecar container (340) hosts the FTP server (150). The FTP server sidecar container (340) supports any kind of the data file transfer server. The FTP server sidecar container (340) does not affect the operations (e.g., security operations or the like) of the DU deployment node.

A container user identifier (UID) 'x' and container group identifier (GID) 'y' shall be arbitrary day 0 inputs to the RUMGR POD deployment (320). The container UID 'x' and the Container GID 'y' shall be mapped to a user with password (e.g., hashed password or the like) inside the container. Here the container UID 'x' and the container GID 'y' are used to map between the processes running inside the FTP server sidecar container (340) and the RUMGR POD deployment (320). The username and password shall be shared to the RU (110) for downloading the RU software image over a SFTP session. Restrictions applied to this user are as follows:

a) will have read and write access only to the directory hosting the RU SW images (e.g., /var/run/sw_images or the like), b) will not have read and write access to sensitive information (like/etc/shadow) in filesystem,
c) will be only allowed to establish secure FTP session. The SSH access will be disabled for this user,
d) will not have access to any sensitive and proprietary information as non will be packaged in this sidecar container image, and
e) Will not have read/write access to any hostPath volumes as none are mounted in the FTP server sidecar container (340).

The FTP server sidecar container (340) will be configured to use unprivileged port 2022 (or similar) to provide a secure ftp service.

FIG. 4 is a flow chart (S400) illustrating a method for handling the FTP server deployment as part of the DU network function of the wireless network (1000), according to the embodiments as disclosed herein.

At S402, the method includes hosting the FTP server in the sidecar container. At S404, the method includes storing the RU software image in the sidecar container. At S406, the method includes hosting the DU application in the RU manager container. At S408, the method includes storing the application container sensitive information in the RU manager container. At S410, the method includes sending the sidecar container credentials from the sidecar container to the RU.

At S412, the method includes allocating restricted access to the RU while downloading the RU software image from the sidecar container. At S414, the method includes downloading the RU software image from the sidecar container based on the allocated restricted access using the FTP service.

The method can be used to handle the FTP server deployment as part of the DU network function of the wireless network (1000), so as to improve the security and reduces the network load in the wireless network (1000).

The various actions, acts, blocks, steps, or the like in the flow charts (S400) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system for File Transfer Protocol (FTP) server deployment as part of a Distributed Unit (DU) network function of a wireless network, wherein the system comprises:
a memory storing instructions; and
at least one hardware processor configured to execute the instructions to implement a DU comprising:
a Radio Unit (RU) manager container hosting a DU application and application container sensitive information at a first directory; and
a sidecar container that hosts the FTP server, a RU software (SW) image of an RU and sidecar container credentials at a second directory, wherein the sidecar container sends sidecar container credentials to the RU in the wireless network to download the RU software image using a file transfer protocol (FTP) service,
wherein the RU establishes a FTP session with the sidecar container using the sidecar container credentials and downloads the RU software image from the sidecar container using a FTP service, and
wherein the at least one hardware processor is configured to execute the instructions to implement the DU to provide the RU software image from the sidecar container using the FTP by:
allocating restricted access to the RU while downloading the RU software image from the sidecar container; and
allowing the RU to download the RU software image from the sidecar container based on the allocated restricted access using the FTP service, the allocated restricted access being an access provided to the RU to directly download the RU software image from the sidecar container without exposure of the sensitive information in a file system.

2. The system as claimed in claim 1, wherein the restricted access comprises at least one of:
a. enable read and write access only to a second directory hosting the RU SW image at the sidecar container,
b. disable read and write access to the first directory hosting the sensitive information in the application container,
c. enable to establish FTP session and disable SSH access to the RU,
d. disable access to any proprietary information in the sidecar container, and
e. disable read and write access to any host path volumes in the sidecar container.

3. The system as claimed in claim 1, wherein the at least one hardware processor is configured to execute the instructions to implement the DU to establish the FTP service with the sidecar container using the sidecar container credentials by:
receiving the sidecar container credentials by the sidecar container to allow the RU to download the RU software image from the sidecar container using the FTP service;
validating the RU by the RU manager based on the sidecar container credentials; and
establishing the FTP service between the RU and the sidecar container upon successful connection with the RU manager.

4. The system as claimed in claim 1, wherein the sidecar container is configured to provide the FTP service using an unprivileged port.

5. The system as claimed in claim 1, wherein the sidecar container creates a mapping between the sidecar container credentials with the application container sensitive credentials.

6. A method for File Transfer Protocol (FTP) server deployment as part of a Distributed Unit (DU) network function of a wireless network, wherein the method comprises:
hosting, by a DU, the FTP server in a sidecar container of the DU;

storing Radio Unit (RU) image in the sidecar container;
hosting a DU application in a Radio Unit (RU) manager container of the DU;
storing application container sensitive information in the Radio Unit (RU) manager container;
sending the sidecar container credentials from the sidecar container to a RU for downloading the RU software image from the sidecar container using a FTP service;
allocating restricted access to the RU while downloading the RU software image from the sidecar container; and
allowing the RU to download the RU software image from the sidecar container based on the allocated restricted access using the FTP service, the allocated restricted access being an access provided to the RU to directly download the RU software image from the sidecar container without exposure of the sensitive information in a file system.

7. The method as claimed in claim 1, wherein the restricted access comprises at least one of:
   a. enable read and write access only to a directory hosting the RU software image at the sidecar container,
   b. disable read and write access to the sensitive information in the filesystem,
   c. enable to establish FTP session and disable SSH access to the RU,
   d. disable access to any proprietary information in the sidecar container, and
   e. disable read and write access to any host path volumes in the sidecar container.

8. The method as claimed in claim 6, further comprising:
receiving the sidecar container credentials from the RU to download the RU software image from the sidecar container using the FTP service;
validating the RU by the RU manager based on the sidecar container credentials; and
establishing the FTP service between the RU and the sidecar container upon successful connection with the RU manager.

9. The method as claimed in claim 6, wherein the sidecar container is configured to provide the FTP service using an unprivileged port.

10. The method as claimed in claim 6, wherein the sidecar container creates a mapping between the sidecar container credentials with the application container sensitive credentials.

* * * * *